US012728855B2

(12) United States Patent
Pfau

(10) Patent No.: US 12,728,855 B2
(45) Date of Patent: Sep. 8, 2026

(54) CONTROLLER AND CONTROL METHOD FOR BEHAVIOR OF STRADDLE-TYPE VEHICLE

(71) Applicant: Robert Bosch GmbH, Stuttgart (DE)

(72) Inventor: Lars Pfau, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 54 days.

(21) Appl. No.: 18/848,703

(22) PCT Filed: Mar. 14, 2023

(86) PCT No.: PCT/IB2023/052436
§ 371 (c)(1),
(2) Date: Sep. 19, 2024

(87) PCT Pub. No.: WO2023/187525
PCT Pub. Date: Oct. 5, 2023

(65) Prior Publication Data

US 2025/0206307 A1 Jun. 26, 2025

(30) Foreign Application Priority Data

Mar. 31, 2022 (JP) ................................ 2022-060080

(51) Int. Cl.
*B60W 30/16* (2020.01)

(52) U.S. Cl.
CPC ......... *B60W 30/16* (2013.01); *B60W 2300/36* (2013.01); *B60W 2754/10* (2020.02)

(58) Field of Classification Search
CPC ............. B60W 30/16; B60W 2300/36; B60W 2754/10; B60W 2554/4041;
(Continued)

(56) References Cited

U.S. PATENT DOCUMENTS 8,352,111 B2 * 1/2013 Mudalige ............... G08G 1/164
342/458
2021/0110720 A1 * 4/2021 Bang .................... G05D 1/0291
(Continued)

FOREIGN PATENT DOCUMENTS

GB 2570898 A * 8/2019 ........ B60W 60/0023
JP 6291737 B2 * 3/2018
(Continued)

OTHER PUBLICATIONS

International Search Report and Written Opinion for Application No. PCT/IB2023/052436 dated May 22, 2023 (9 pages).

*Primary Examiner* — Daniel M. Robert
(74) *Attorney, Agent, or Firm* — Michael Best & Friedrich LLP

(57) ABSTRACT

The invention obtains a controller and a control method capable of improving assistance performance for a rider. A controller for behavior of a straddle-type vehicle (100) includes: an acquisition section that acquires positional relationship information between the traveling straddle-type vehicle (100) and a target (200); and an execution section that executes positional relationship adjustment operation to automatically change a travel speed of the straddle-type vehicle (100) on the basis of the positional relationship information acquired by the acquisition section and to thereby adjust a positional relationship between the straddle-type vehicle (100) and the target (200). In the positional relationship adjustment operation, the execution section switches between a first operation mode in which the positional relationship between the straddle-type vehicle (100) and the target (200) is brought into a first state and a second operation mode in which the positional relationship between the straddle-type vehicle (100) and the target (200)
(Continued)

is brought into a second state according to whether a group travel mode is valid.

12 Claims, 5 Drawing Sheets

(58) Field of Classification Search
CPC ..... B60W 2554/801; B60W 2554/802; B60W 30/143; B60W 30/165; B60W 30/182; B60W 30/10; B60T 7/22; B60T 8/1706; B60T 2201/022; B60Y 2200/12; G08G 1/00
See application file for complete search history.

(56) References Cited

U.S. PATENT DOCUMENTS

| | | | | |
|---|---|---|---|---|
| 2021/0309195 | A1* | 10/2021 | Oshida | B60T 8/3225 |
| 2025/0065889 | A1* | 2/2025 | Horn | B60W 50/0098 |

FOREIGN PATENT DOCUMENTS

| | | | | |
|---|---|---|---|---|
| JP | 2020500784 | A | 1/2020 | |
| JP | 7238719 | B2 * | 3/2023 | B60W 40/04 |
| WO | 2012091637 | A1 | 7/2012 | |
| WO | 2018172870 | A1 | 9/2018 | |
| WO | WO-2020084915 | A1 * | 4/2020 | B60T 7/12 |
| WO | 2020216490 | A1 | 10/2020 | |
| WO | 2021260479 | A1 | 12/2021 | |

* cited by examiner

[FIG. 1]
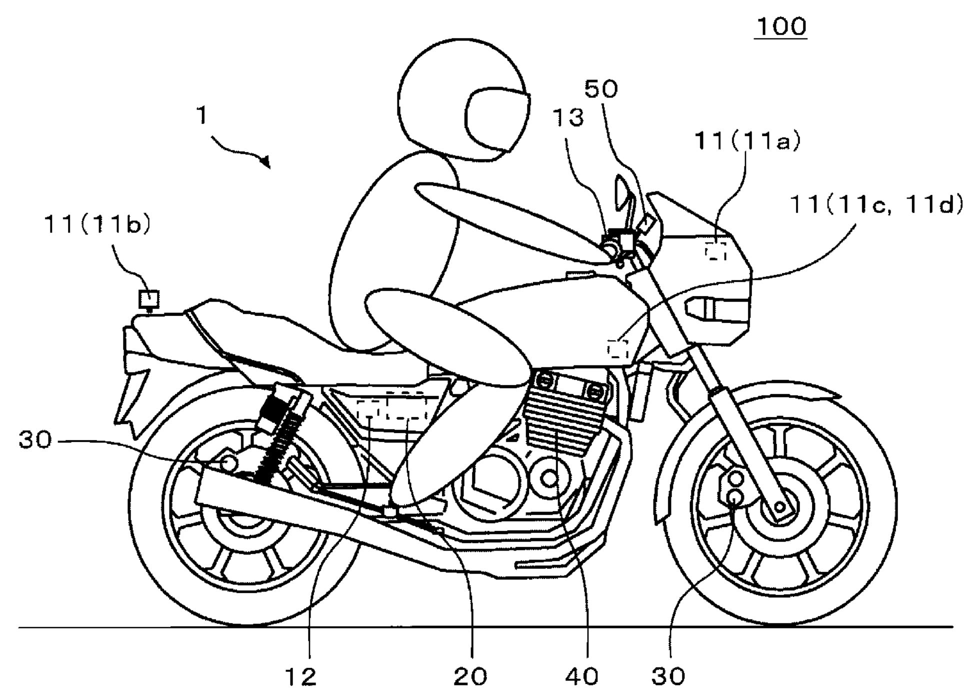
[FIG. 2]
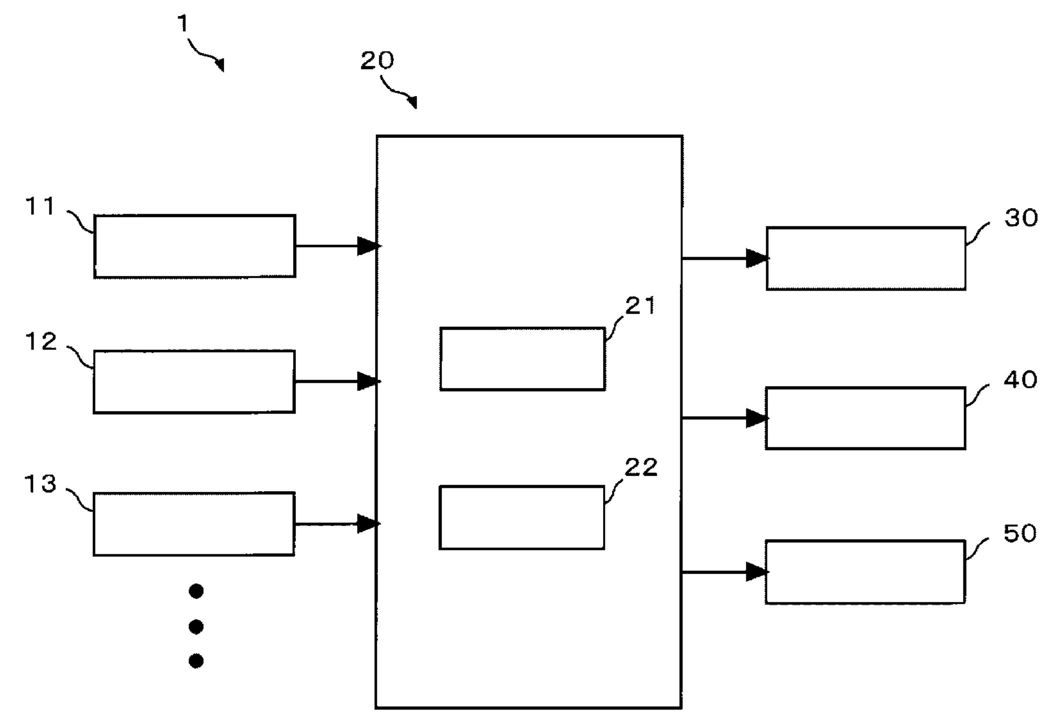

[FIG. 3]
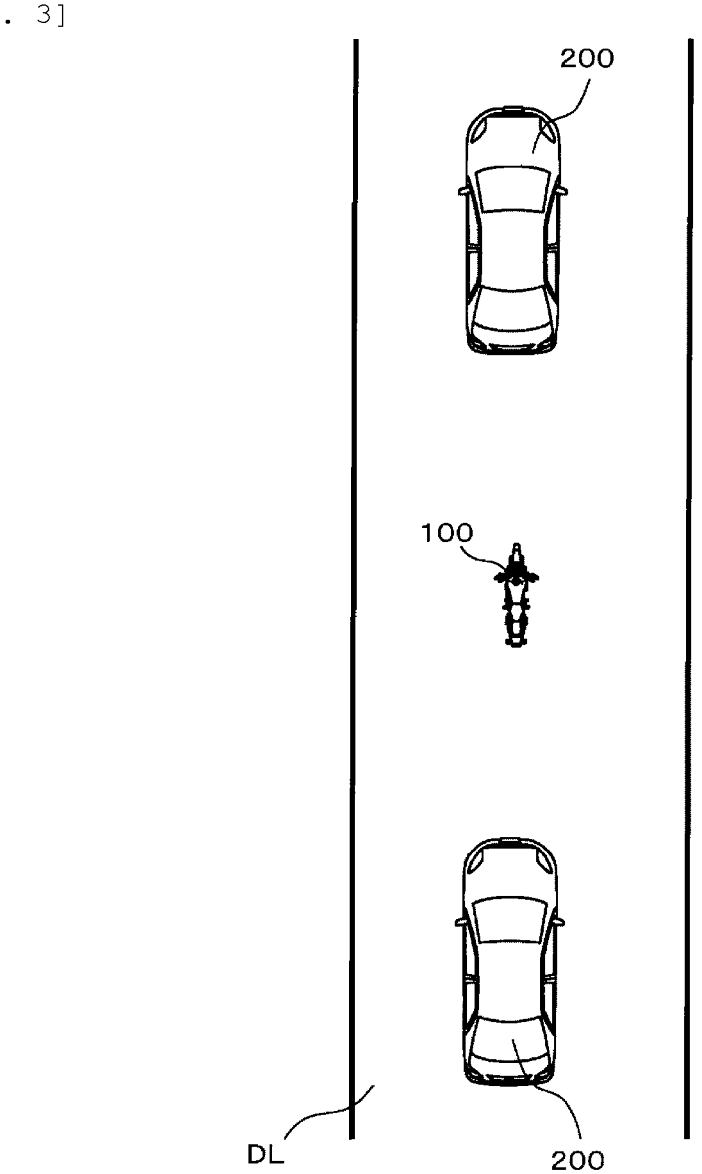
[FIG. 4]
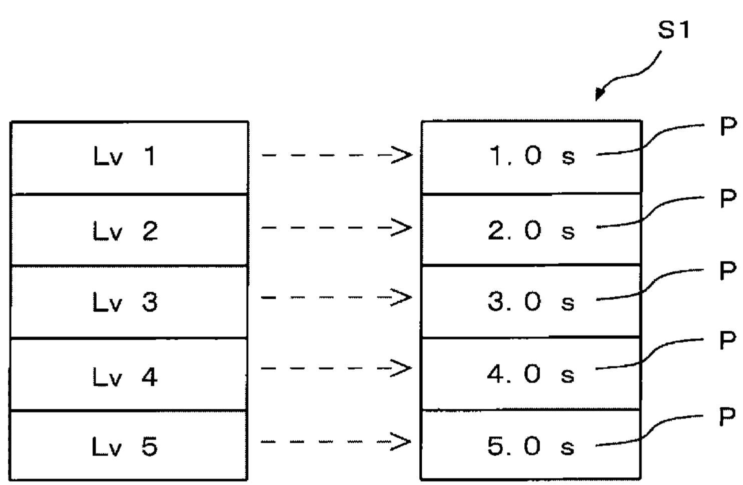

[FIG. 5]
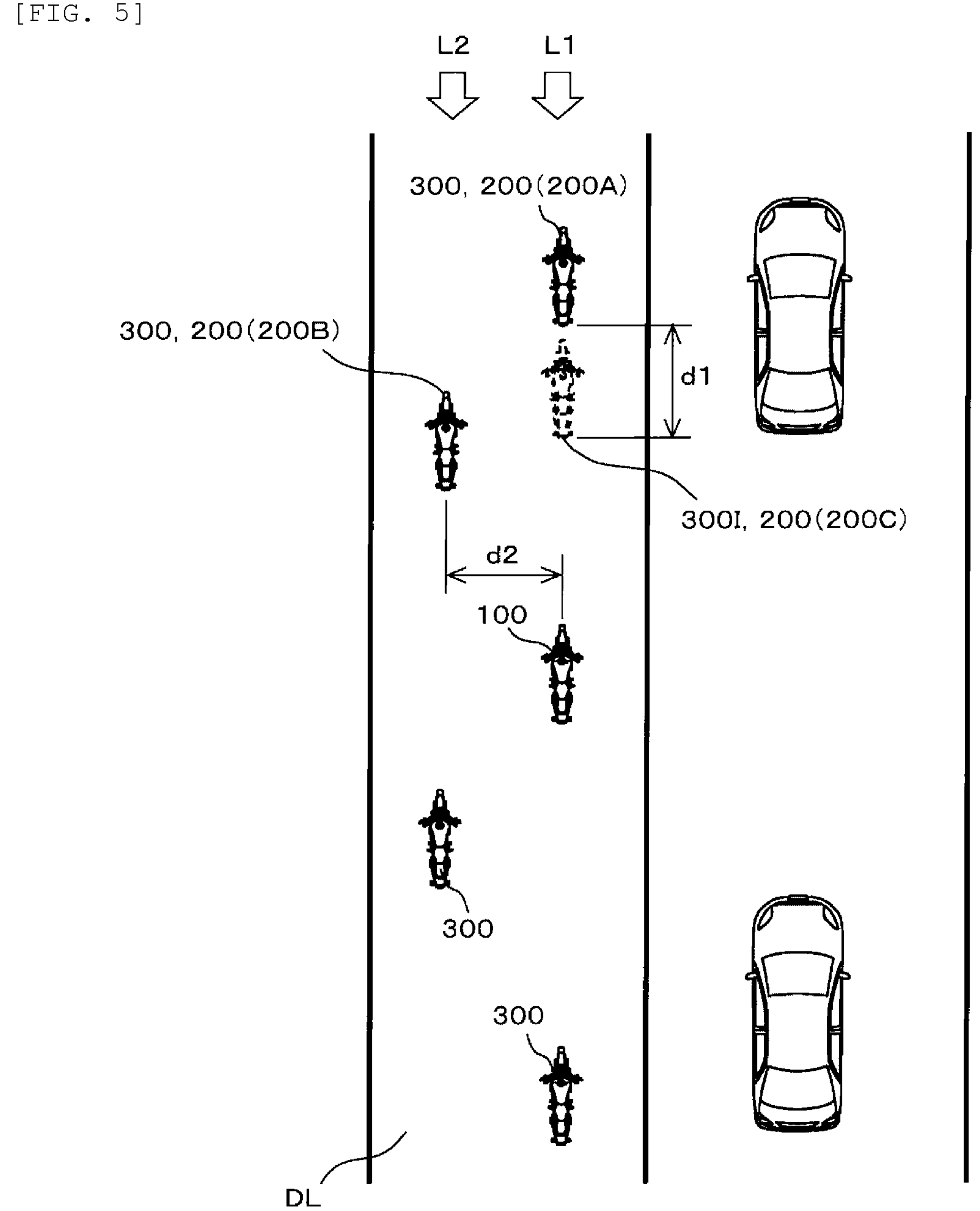

[FIG. 7]
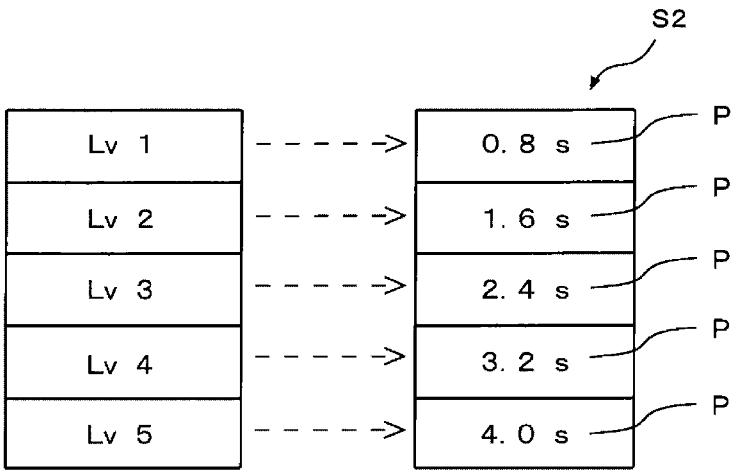
[FIG. 8]
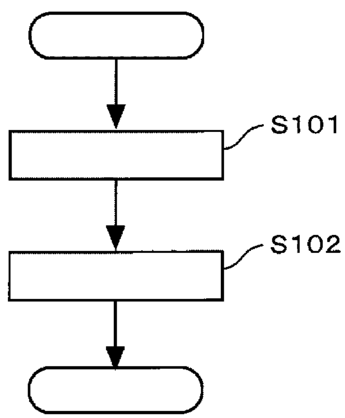

CONTROLLER AND CONTROL METHOD FOR BEHAVIOR OF STRADDLE-TYPE VEHICLE

BACKGROUND

The present invention relates to a controller for behavior of a straddle-type vehicle and a control method for behavior of a straddle-type vehicle.

A conventional controller for behavior of a straddle-type vehicle acquires positional relationship information between a traveling straddle-type vehicle and a target, and executes positional relationship adjustment operation to automatically change a travel speed of the straddle-type vehicle on the basis of the positional relationship information, and to adjust a positional relationship between the straddle-type vehicle and the target (for example, see WO2018/172870A1).

SUMMARY

A body of the straddle-type vehicle is much smaller than those of other vehicles (for example, a passenger car, a truck, and the like). Thus, such a situation possibly occurs where plural straddle-type vehicles travel in line and/or side by side in a unique positional relationship (for example, a situation where the plural straddle-type vehicles travel side by side in a single travel lane, a situation where the plural straddle-type vehicles travel while forming plural vehicle lines in the single travel lane, or the like). In such a situation, it may be difficult for the conventional controller for the behavior of the straddle-type vehicle to execute the appropriate positional relationship adjustment operation.

The invention has been made with the above-described problem as the background and therefore obtains a controller capable of improving assistance performance for a rider. The invention also obtains a control method capable of improving the assistance performance for the rider.

A controller according to the invention is a controller for behavior of a straddle-type vehicle and includes: an acquisition section that acquires positional relationship information between the traveling straddle-type vehicle and a target; and an execution section that executes positional relationship adjustment operation to automatically change a travel speed of the straddle-type vehicle on the basis of the positional relationship information acquired by the acquisition section and to thereby adjust a positional relationship between the straddle-type vehicle and the target. In the positional relationship adjustment operation, the execution section switches between a first operation mode in which the positional relationship between the straddle-type vehicle and the target is brought into a first state and a second operation mode in which the positional relationship between the straddle-type vehicle and the target is brought into a second state differing from the first state according to whether a group travel mode is valid. The group travel mode is a mode in which the straddle-type vehicle travels with at least one other straddle-type vehicle in a group.

A control method according to the invention is a control method for behavior of a straddle-type vehicle and includes: an acquisition step in which an acquisition section of a controller acquires positional relationship information between the traveling straddle-type vehicle and a target; and an execution step in which an execution section of the controller executes positional relationship adjustment operation to automatically change a travel speed of the straddle-type vehicle on the basis of the positional relationship information acquired in the acquisition step and to thereby adjust a positional relationship between the straddle-type vehicle and the target. In the execution step, in the positional relationship adjustment operation, the execution section switches between a first operation mode in which the positional relationship between the straddle-type vehicle and the target is brought into a first state and a second operation mode in which the positional relationship between the straddle-type vehicle and the target is brought into a second state differing from the first state according to whether a group travel mode is valid. The group travel mode is a mode in which the straddle-type vehicle travels with at least one other straddle-type vehicle in a group.

In the controller and the control method according to the invention, in the positional relationship adjustment operation, the first operation mode, in which the positional relationship between the straddle-type vehicle and the target is brought into the first state, and the second operation mode, in which the positional relationship between the straddle-type vehicle and the target is brought into the second state differing from the first state, are switched according to whether the group travel mode is valid, and the group travel mode is the mode in which the straddle-type vehicle travels with the at least one other straddle-type vehicle in the group. Therefore, it is possible to execute the appropriate positional relationship adjustment operation under a situation where the plural straddle-type vehicles travel in line or side by side in a unique positional relationship, and it is thus possible to improve assistance performance for a rider.

BRIEF DESCRIPTION OF DRAWINGS

FIG. 1 is a view illustrating a mounted state of a rider-assistance system according to an embodiment of the invention to a straddle-type vehicle.

FIG. 2 is a diagram illustrating a system configuration of the rider-assistance system according to the embodiment of the invention.

FIG. 3 is a view for explaining the configuration of the rider-assistance system according to the embodiment of the invention.

FIG. 4 is a view for explaining the configuration of the rider-assistance system according to the embodiment of the invention.

FIG. 5 is a view for explaining the configuration of the rider-assistance system according to the embodiment of the invention.

FIG. 6 is a view for explaining the configuration of the rider-assistance system according to the embodiment of the invention.

FIG. 7 is a view for explaining the configuration of the rider-assistance system according to the embodiment of the invention.

FIG. 8 is a chart for explaining an operation flow of a controller in the rider-assistance system according to the embodiment of the invention.

DETAILED DESCRIPTION

A description will hereinafter be made on a controller and a control method according to the invention with reference to the drawings.

A configuration, operation, and the like, which will be described below, merely constitute one example, and the controller and the control method according to the invention are not limited to a case with such a configuration, such operation, and the like.

For example, a description will hereinafter be made on a case where the controller and the control method according to the invention are used for a rider-assistance system of a two-wheeled motor vehicle. However, the controller and the control method according to the invention may be used for a rider-assistance system of a straddle-type vehicle other than the two-wheeled motor vehicle. The straddle-type vehicle means a vehicle that a rider drives while straddling a body thereof. Examples of the straddle-type vehicle are motorcycles (the two-wheeled motor vehicle and a three-wheeled motor vehicle) and a pedal-driven vehicle. The motorcycles include a vehicle having an engine as a power source, a vehicle having an electric motor as the power source, and the like. Examples of the motorcycles are a motorbike, a scooter, and an electric scooter. The pedal-driven vehicle means a vehicle capable of traveling forward on a road by a depression force applied to pedals by the rider. Examples of the pedal-driven vehicle are a normal pedal-driven vehicle, an electrically-assisted pedal-driven vehicle, and an electric pedal-driven vehicle.

The same or similar description will appropriately be simplified or will not be made below. In the drawings, the same or similar portions will be denoted by the same reference sign or will not be denoted by a reference sign. A detailed structure will appropriately be illustrated in a simplified manner or will not be illustrated.

Embodiment

A description will hereinafter be made on a rider-assistance system according to an embodiment.

Configuration of Rider-Assistance System

A description will be made on a configuration of the rider-assistance system according to the embodiment.

Figure 6:
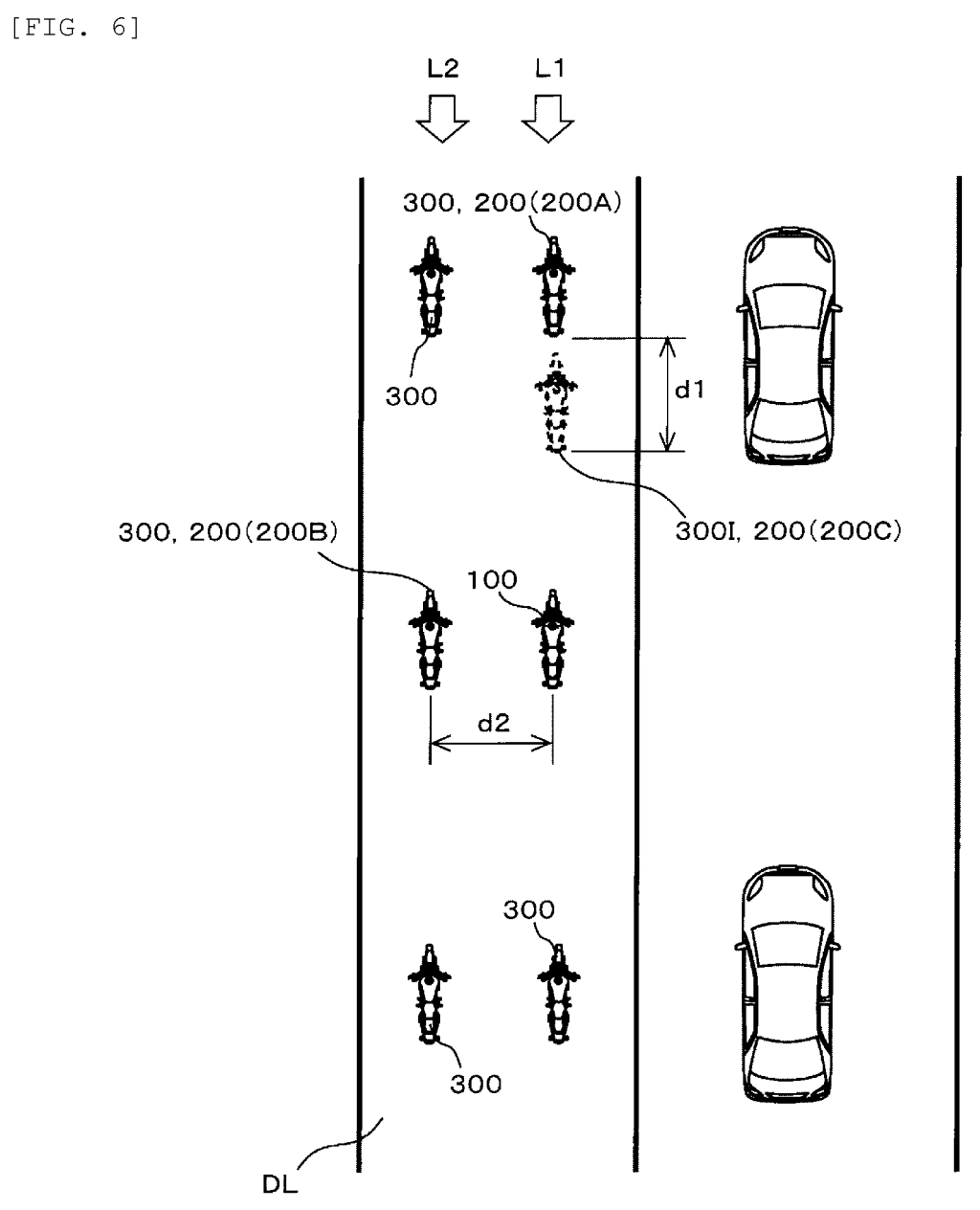

FIG. 1 is a view illustrating a mounted state of the rider-assistance system according to the embodiment of the invention to the straddle-type vehicle. FIG. 2 is a diagram illustrating a system configuration of the rider-assistance system according to the embodiment of the invention. FIG. 3 to FIG. 7 are views for explaining the configuration of the rider-assistance system according to the embodiment of the invention.

As illustrated in FIG. 1 and FIG. 2, a rider-assistance system 1 is mounted to a straddle-type vehicle 100. For example, the rider-assistance system 1 includes a surrounding environment sensor 11, a vehicle behavior sensor 12, a setting input device 13, a controller (ECU) 20, a brake system 30, a drive system 40, and a notification device 50.

In the rider-assistance system 1, the controller 20 executes rider-assistance operation to assist with driving by a rider of the straddle-type vehicle 100 by using output of the surrounding environment sensor 11 and the vehicle behavior sensor 12 and output of the setting input device 13. The controller 20 executes the rider-assistance operation by outputting commands to the various devices (for example, the brake system 30, the drive system 40, the notification device 50, and the like). When necessary, the controller 20 receives output of various sensors (not illustrated) for detecting other types of information (for example, information on an operation state of the brake system 30 by the rider, information on an operation state of the drive system 40 by the rider, and the like). Each component of the rider-assistance system 1 may exclusively be used for the rider-assistance system 1 or may be shared with another system.

For example, the surrounding environment sensor 11 may be a surrounding environment sensor 11*a* that faces the front of the straddle-type vehicle 100, may be a surrounding environment sensor 11*b* that faces the rear of the straddle-type vehicle 100, may be a surrounding environment sensor 11*c* that faces the left of the straddle-type vehicle 100, may be a surrounding environment sensor 11*d* that faces the right of the straddle-type vehicle 100, or may be a combination of those. Examples of the surrounding environment sensors 11*a*, 11*b*, 11*c*, 11*d* are a radar, a Lidar sensor, an ultrasonic sensor, and a camera. At least one part of the surrounding environment sensor 11*c* and the surrounding environment sensor 11*d* may be substituted by the surrounding environment sensor 11*a* or the surrounding environment sensor 11*b*.

Examples of the vehicle behavior sensor 12 are a vehicle speed sensor and an inertial measurement unit (IMU). The vehicle speed sensor detects a speed generated to the straddle-type vehicle 100. The vehicle speed sensor may detect another physical quantity that can substantially be converted to a travel speed of the straddle-type vehicle 100. The IMU detects acceleration in three axes (a front-rear direction, a vehicle width direction, and a vehicle height direction) and angular velocities in three axes (roll, pitch, and yaw) generated to the straddle-type vehicle 100. The IMU may detect other physical quantities that can substantially be converted to the three-axis acceleration and the three-axis angular velocities generated to the straddle-type vehicle 100. Alternatively, the IMU may partially detect the three-axis acceleration and the three-axis angular velocities.

The setting input device 13 accepts input of various settings by the rider. For example, the rider can switch between validity and invalidity of each of various types of the rider-assistance operation by using the setting input device 13. In addition, for example, the rider can set various modes or various threshold values that are used for the various types of the rider-assistance operation by using the setting input device 13. The setting input device 13 may accept an operation by the rider's body (for example, a hand, a foot, or the like) or may accept voice produced by the rider. In addition, the setting input device 13 may be provided to the straddle-type vehicle 100 or may be provided to an accessory (for example, a helmet, a glove, or the like) that is associated with the straddle-type vehicle 100.

The controller 20 at least includes an acquisition section 21 and an execution section 22. The sections of the controller 20 may collectively be provided in a single casing or may separately be provided in plural casings. In addition, the controller 20 as a whole or each of the sections of the controller 20 may be a microcomputer, a microprocessor unit, or the like, may be one whose firmware and the like can be updated, or may be a program module or the like that is executed by a command from a CPU or the like, for example.

During travel of the straddle-type vehicle 100, the acquisition section 21 acquires surrounding environment information of the straddle-type vehicle 100 on the basis of the output of the surrounding environment sensor 11. The surrounding environment information includes positional relationship information between the straddle-type vehicle 100 and a vehicle that travels around the straddle-type vehicle 100. Examples of the positional relationship information are information on a relative position, a relative distance, a relative speed, relative acceleration, relative jerk, a passing time difference, and a predicted time until a collision. The positional relationship information may be information on another physical quantity that can substantially be converted to one of those.

When positional relationship adjustment operation as the rider-assistance operation is validated, the execution section 22 determines a target from the vehicles traveling around the straddle-type vehicle 100 on the basis of the positional relationship information acquired by the acquisition section 21. In the case where the validated positional relationship adjustment operation is intended to assist with driving by the rider in response to an event that occurs in front of the straddle-type vehicle 100, the execution section 22 determines, as the target, the vehicle that travels ahead of the straddle-type vehicle 100. In the case where the validated positional relationship adjustment operation is intended to assist with driving by the rider in response to an event that occurs behind the straddle-type vehicle 100, the execution section 22 determines, as the target, the vehicle that follows the straddle-type vehicle 100.

The execution section 22 executes the positional relationship adjustment operation to automatically change the travel speed of the straddle-type vehicle 100 on the basis of the positional relationship information between the straddle-type vehicle 100 and the target that is acquired by the acquisition section 21 and to thereby adjust a positional relationship between the straddle-type vehicle 100 and the target. The positional relationship adjustment operation is operation to adjust the positional relationship in the front-rear direction of a travel lane. When executing the positional relationship adjustment operation, the execution section 22 automatically changes the travel speed of the straddle-type vehicle 100 by outputting the command to the brake system 30 or the drive system 40. The brake system 30 brakes the straddle-type vehicle 100. The drive system 40 as a power source of the straddle-type vehicle 100 drives the straddle-type vehicle 100. The brake system 30 may be controlled to generate or increase deceleration of the straddle-type vehicle 100 or may be controlled to generate or increase the acceleration of the straddle-type vehicle 100. The drive system 40 may be controlled to generate or increase the acceleration of the straddle-type vehicle 100 or may be controlled to generate or increase the deceleration of the straddle-type vehicle 100.

The positional relationship adjustment operation may be operation to automatically generate the deceleration or the acceleration to the straddle-type vehicle 100 without relying on the rider's operation of the brake system 30 and the drive system 40 and to thereby adjust the positional relationship between the straddle-type vehicle 100 and the target (for example, adaptive cruise control operation to set the target as a speed following target, operation to decelerate or accelerate the straddle-type vehicle 100 in order to avoid or mitigate a collision against the target, operation to actuate the brake system 30 in a state where the rider operates the drive system 40 in order to control the positional relationship with the target to the positional relationship corresponding to an operation amount of the drive system 40, operation to actuate the drive system 40 in a state where the rider operates the brake system 30 in order to control the positional relationship with the target to the positional relationship corresponding to an operation amount of the brake system 30, or the like), may be operation to automatically increase or reduce a braking force generated to the straddle-type vehicle 100 in order to correct excess or deficiency of the rider's operation of the brake system 30 and thereby adjust the positional relationship between the straddle-type vehicle 100 and the target, or may be operation to automatically increase or reduce drive power generated to the straddle-type vehicle 100 in order to correct excess or deficiency of the rider's operation of the drive system 40 and thereby adjust the positional relationship between the straddle-type vehicle 100 and the target.

When executing the positional relationship adjustment operation, the execution section 22 causes the notification device 50 to execute notification operation for the rider as necessary. The notification device 50 may notify the rider by display (that is, a sensation through a visual organ as a sensory organ), may notify the rider by sound (that is, a sensation through an auditory organ as the sensory organ), or may notify the rider by vibrations (that is, a sensation through a tactile organ as the sensory organ). Examples of the notification device 50 are a display, a lamp, a speaker, and a vibrator. The notification device 50 may be provided to the straddle-type vehicle 100 or may be provided to the accessory (for example, the helmet, the glove, or the like) that is associated with the straddle-type vehicle 100.

In the positional relationship adjustment operation that is executed in a normal state, that is, a state where it is determined that a group travel mode, which will be described below, is not valid, as illustrated in FIG. 3, the execution section 22 determines, as a target 200, the vehicle that travels ahead of the straddle-type vehicle 100 or the vehicle that follows the straddle-type vehicle 100. The execution section 22 stores a state amount set S1 as illustrated in FIG. 4. In the state amount set S1, plural state amounts P, each of which defines the positional relationship between the straddle-type vehicle 100 and the target 200, are combined. FIG. 4 illustrates a case where the state amount P is the passing time difference. However, the state amount P may be another state amount such as the relative distance or the predicted time until the collision. By using the setting input device 13, the rider of the straddle-type vehicle 100 can set whether to adjust the positional relationship between the straddle-type vehicle 100 and the target 200 to have an approaching tendency or to adjust the positional relationship between the straddle-type vehicle 100 and the target 200 to have a separating tendency. In other words, the rider of the straddle-type vehicle 100 can select a degree of the adjustment of the positional relationship between the straddle-type vehicle 100 and the target 200 from plural levels. FIG. 4 illustrates a case where the rider of the straddle-type vehicle 100 selects from five levels that are Lv 1 to Lv 5. However, the number of the levels may differ. In FIG. 4, Lv 1 corresponds a case where the positional relationship between the straddle-type vehicle 100 and the target 200 is adjusted to have the most approaching tendency, and Lv 5 corresponds a case where the positional relationship between the straddle-type vehicle 100 and the target 200 is adjusted to have the most separating tendency. The acquisition section 21 acquires, as setting input information, information on setting with the setting input device 13 on the basis of the output of the setting input device 13. In the positional relationship adjustment operation, the execution section 22 selects the state amount P that corresponds to the setting input information (that is, Lv information) from the state amount set S1, controls the travel speed of the straddle-type vehicle 100 so as to obtain such a state amount P, and thereby adjusts the positional relationship between the straddle-type vehicle 100 and the target 200. When executing the positional relationship adjustment operation, the execution section 22 controls such that an absolute value of a first-order derivative and/or an absolute value of a second-order derivative of the travel speed generated to the straddle-type vehicle 100 does not exceed a limit value. The limit value may be the same or different between a case where the first-order derivative and/or the second-order derivative of the travel speed generated to the straddle-type vehicle 100 is a positive value and a case where the first-order derivative and/or the second-order derivative of the travel speed generated to the straddle-type vehicle 100 is a negative value. The execution section 22 may control such that the first-order derivative and/or the second-order derivative of the travel speed generated to the straddle-type vehicle 100 does not exceed the limit value only when the first-order derivative and/or the second-order derivative is the positive value, may control such that the first-order derivative and/or the second-order derivative of the travel speed generated to the straddle-type vehicle 100 does not exceed the limit value only when the first-order derivative and/or the second-order derivative is the negative value, or may control to achieve both of those. In addition, the execution section 22 controls distribution of the braking force to front and rear wheels of the straddle-type vehicle 100 to a predetermined ratio when outputting the command to the brake system 30 so as to execute the positional relationship adjustment operation.

Here, when initiating the positional relationship adjustment operation and/or during the execution of the positional relationship adjustment operation, the execution section 22 determines whether the group travel mode is valid. As illustrated in FIG. 5 and FIG. 6, the group travel mode is a mode in which the straddle-type vehicle 100 travels with at least one other straddle-type vehicle 300 in a group, that is, in a team.

As a first example, the execution section 22 automatically switches between the validity and the invalidity of the group travel mode on the basis of the surrounding environment information that is acquired by the acquisition section 21. The execution section 22 determines whether the group travel mode is valid on the basis of information on the switchover. Based on the surrounding environment information that is acquired by the acquisition section 21, the execution section 22 determines whether travel of the straddle-type vehicle 100 and the other straddle-type vehicle 300, which is located around the straddle-type vehicle 100, in a particular aspect (for example, an aspect as illustrated in FIG. 5 in which two vehicle lines are formed such that the straddle-type vehicle 100 and the plural other straddle-type vehicles 300 travel in a zig-zag arrangement, an aspect as illustrated in FIG. 6 in which the two vehicle lines are formed such that the straddle-type vehicle 100 and the plural other straddle-type vehicles 300 travel side by side, an aspect in which the straddle-type vehicle 100 and the one other straddle-type vehicle 300 travel in alignment in the front-rear direction, a right-left direction, or a diagonal direction, or the like) continues over a reference time or a reference travel distance. If the determination is positive, the execution section 22 automatically validates the group travel mode. The execution section 22 may identify the other straddle-type vehicle 300 that is located in a travel lane DL in which the straddle-type vehicle 100 travels, and may only set the identified other straddle-type vehicle 300 as a determination target. Alternatively, the execution section 22 may identify the other straddle-type vehicle 300 that remains located around the straddle-type vehicle 100 over the reference time or the reference travel distance without using information on a boundary of the travel lane DL, and may set the identified other straddle-type vehicle 300 as the determination target.

As a second example, the validity or the invalidity of the group travel mode is switched by the rider's setting input. The acquisition section 21 acquires information on the setting as the setting input information on the basis of the output of the setting input device 13. The execution section 22 determines whether the group travel mode is valid on the basis of the setting input information. Here, the execution section 22 may automatically suggest to validate and/or invalidate the group travel mode on the basis of the surrounding environment information that is acquired by the acquisition section 21, and the suggestion may be confirmed by the rider's setting input of acceptance.

In a state where it is determined that the group travel mode is valid, the execution section 22 executes the different positional relationship adjustment operation from that in the normal state, that is, the state where it is determined that the group travel mode is not valid. The positional relationship adjustment operation is operation to adjust the positional relationship in the front-rear direction of the travel lane DL. A description will hereinafter be made on a case where the validated positional relationship adjustment operation is intended to assist with driving by the rider in response to the event that occurs in front of or on the side of the straddle-type vehicle 100 and where the execution section 22 adjusts the positional relationship with the other straddle-type vehicle 300 that travels ahead of the straddle-type vehicle 100 or the other straddle-type vehicle 300 that travels side by side with the straddle-type vehicle 100. In the case where the validated positional relationship adjustment operation is intended to assist with driving by the rider in response to the event that occurs behind the straddle-type vehicle 100, the execution section 22 adjusts the positional relationship with the other straddle-type vehicle 300, which follows the straddle-type vehicle 100, by a similar method.

As the first example, a description will be made on the determination of the target 200 in the case where the validated positional relationship adjustment operation is executed to adjust the positional relationship between the straddle-type vehicle 100 and the one other straddle-type vehicles 300, which travels with the straddle-type vehicle 100 in the group, in the front-rear direction of the travel lane DL.

Based on the surrounding environment information acquired by the acquisition section 21, the execution section 22 identifies the other straddle-type vehicle 300, which travels with the straddle-type vehicle 100 in the group, from vehicles located around the straddle-type vehicle 100. A determination on whether the other straddle-type vehicle 300 is a vehicle that travels with the straddle-type vehicle 100 in the group may be made on the basis of information that is registered by the rider in advance (for example, location information of the straddle-type vehicle 100 in the group, identification information of the other straddle-type vehicle 300 that belongs to the group, or the like), or may be made on the basis of information on time course of the positional relationship with the straddle-type vehicle 100.

As illustrated in FIG. 5 and FIG. 6, for example, the execution section 22 determines, as the target 200 (denoted as 200A in FIG. 5 and FIG. 6), the other straddle-type vehicle 300 that belongs to a first vehicle line L1, to which the straddle-type vehicle 100 in the group belongs, and that travels ahead of the straddle-type vehicle 100 at the nearest location to the straddle-type vehicle 100. In addition, for example, the execution section 22 determines, as the target 200 (denoted as 200B in FIG. 5 and FIG. 6), the other straddle-type vehicle 300 that belongs to a second vehicle line L2, to which the straddle-type vehicle 100 in the group does not belong, and that travels ahead of or side by side with the straddle-type vehicle 100 at the nearest location to the straddle-type vehicle 100. The execution section 22 identifies to which of the right and left vehicle lines in the travel lane DL the straddle-type vehicle 100 belongs on the basis of the information that is registered by the rider in advance (for example, the location information of the straddle-type vehicle 100 in the group, or the like) or on the basis of the information on the time course of the positional relationship with each of the plural other straddle-type vehicles 300, that is, uses group vehicle line information. In this way, the execution section 22 can identify the other straddle-type vehicle 300 that belongs to the first vehicle line L1 and the other straddle-type vehicle 300 that belongs to the second vehicle line L2.

As the second example, a description will be made on the determination of the target 200 in the case where the validated positional relationship adjustment operation is executed to adjust the positional relationship between the straddle-type vehicle 100 and the plural other straddle-type vehicles 300, each of which travels with the straddle-type vehicle 100 in the group, in the front-rear direction of the travel lane DL.

Based on the surrounding environment information that is acquired by the acquisition section 21, the execution section 22 identifies the other straddle-type vehicles 300, each of which travels with the straddle-type vehicle 100 in the group, from the vehicles that are located around the straddle-type vehicle 100. The determination on whether the other straddle-type vehicles 300 are the vehicles, each of which travels with the straddle-type vehicle 100 in the group, may be made on the basis of the information that is registered by the rider in advance (for example, the location information of the straddle-type vehicle 100 in the group, the identification information of the other straddle-type vehicles 300 that belong to the group, and the like), or may be made on the basis of the information on the time course of the positional relationship with the straddle-type vehicle 100.

As illustrated in FIG. 5 and FIG. 6, for example, the execution section 22 determines, as the target 200 (denoted as 200C in FIG. 5 and FIG. 6), a single imaginary vehicle 300I that represents the other straddle-type vehicle 300 belonging to the first vehicle line L1, to which the straddle-type vehicle 100 in the group belongs, and traveling ahead of the straddle-type vehicle 100 at the nearest location to the straddle-type vehicle 100 and the other straddle-type vehicle 300 belonging to the second vehicle line L2, to which the straddle-type vehicle 100 in the group does not belong, and traveling ahead of or side by side with the straddle-type vehicle 100 at the nearest location to the straddle-type vehicle 100. The execution section 22 identifies to which of the right and left vehicle lines in the travel lane DL the straddle-type vehicle 100 belongs on the basis of the information that is registered by the rider in advance (for example, information on the travel location of the straddle-type vehicle 100 in the group, or the like) or on the basis of the information on the time course of the positional relationship with each of the plural other straddle-type vehicles 300, that is, uses the group vehicle line information. In this way, the execution section 22 can identify the other straddle-type vehicle 300 that belongs to the first vehicle line L1 and the other straddle-type vehicle 300 that belongs to the second vehicle line L2. The imaginary vehicle 300I is a vehicle that is imagined as the other straddle-type vehicle 300 (denoted as 200A in FIG. 5 and FIG. 6) as follows. The other straddle-type vehicle 300 that belongs to the first vehicle line L1, to which the straddle-type vehicle 100 in the group belongs, and that travels ahead of the straddle-type vehicle 100 at the nearest location to the straddle-type vehicle 100 travels at a location shifted by a distance d1 in the front-rear direction of the travel lane DL. The imaginary vehicle 300I may be shifted in a manner to approach the straddle-type vehicle 100 (that is, such that the distance d1 obtains a positive value) or may be shifted in a manner to move away from the straddle-type vehicle 100 (that is, such that the distance d1 obtains a negative value). The distance d1 is a value that fluctuates according to a distance d2 between the straddle-type vehicle 100 and the other straddle-type vehicle 300 (denoted as 200B in FIG. 5 and FIG. 6), which belongs to the second vehicle line L2, to which the straddle-type vehicle 100 in the group does not belong, and travels ahead of or side by side with the straddle-type vehicle 100 at the nearest location to the straddle-type vehicle 100, in a width direction of the travel lane DL. For example, as the distance d2 is reduced, the distance d1 is increased. A relationship between the distance d1 and the distance d2 may not fluctuate, may fluctuate according to a travel state of the straddle-type vehicle 100, or may fluctuate according to the setting input by the rider of the straddle-type vehicle 100. In addition, the imaginary vehicle 300I may represent the three or more other straddle-type vehicles 300.

After determining the target 200, the execution section 22 executes the positional relationship adjustment operation to automatically change the travel speed of the straddle-type vehicle 100 on the basis of positional relationship information between the straddle-type vehicle 100 and the target 200 that is acquired by the acquisition section 21 and to thereby adjust the positional relationship between the straddle-type vehicle 100 and the target 200.

As the first example, the execution section 22 stores a state amount set S2 as illustrated in FIG. 7. The state amount set S2 is similar to the state amount set S1 illustrated in FIG. 4, and in the state amount set S2, the plural state amounts P, each of which defines the positional relationship between the straddle-type vehicle 100 and the target 200, are combined. In the positional relationship adjustment operation, the execution section 22 selects the state amount P that corresponds to the rider's setting input information (that is, the Lv information) from the state amount set S2, controls the travel speed of the straddle-type vehicle 100 so as to obtain such a state amount P, and thereby adjusts the positional relationship between the straddle-type vehicle 100 and the target 200.

Here, compared to the state amount set S1, in the state amount set S2, the state amounts P, each of which is used to adjust the positional relationship between the straddle-type vehicle 100 and the target 200 to have the approaching tendency, are combined. In the case where the group travel mode is not valid (corresponding to the "first operation mode" in the invention), in the positional relationship adjustment operation, the state amount set S1 is used, and the positional relationship between the straddle-type vehicle 100 and the target 200 is controlled to be in a state of increasing the passing time difference, that is, to be in a state of having the separating tendency (corresponding to the "first state" in the invention). In the case where the group travel mode is valid (corresponding to the "second operation mode" in the invention), in the positional relationship adjustment operation, the state amount set S2 is used, and the positional relationship between the straddle-type vehicle 100 and the target 200 is controlled to be in a state of reducing the passing time difference, that is, to be in a state of having the approaching tendency (corresponding to the "second state" in the invention).

For example, when the group travel mode is switched from being invalid to being valid, the execution section 22 automatically selects, from the state amount set S2, the state amount P that corresponds to the same Lv as the Lv corresponding to the state amount P that has been selected from the state amount set S1. Alternatively, for example, when the group travel mode is switched from being invalid to being valid, the execution section 22 automatically selects, from the state amount set S2, the state amount P that is the closest to the state amount P that has been selected from the state amount set S1. Further alternatively, for example, when the group travel mode is switched from being invalid to being valid, the execution section 22 automatically selects, from the state amount set S2, the state amount P that corresponds to the particular Lv (for example, the lowest Lv, the highest Lv, the intermediate Lv, or the like) regardless of the state amount P that has been selected from the state amount set S1. Further alternatively, for example, when the group travel mode is switched from being invalid to being valid, the execution section 22 automatically selects, from the state amount set S2, the state amount P that has been selected in the last positional relationship adjustment operation executed at the time when the group travel mode is valid regardless of the state amount P that has been selected from the state amount set S1. Further alternatively, for example, when the group travel mode is switched from being invalid to being valid, the execution section 22 automatically selects, from the state amount set S2, the state amount P that corresponds to the Lv set as an initial value by the rider in advance regardless of the state amount P that has been selected from the state amount set S1.

For example, when the group travel mode is switched from being valid to being invalid, the execution section 22 automatically selects, from the state amount set S1, the state amount P that corresponds to the same Lv as the Lv corresponding to the state amount P that has been selected from the state amount set S2. Alternatively, for example, when the group travel mode is switched from being valid to being invalid, the execution section 22 automatically selects, from the state amount set S1, the state amount P that is the closest to the state amount P that has been selected from the state amount set S2. Further alternatively, for example, when the group travel mode is switched from being valid to being invalid, the execution section 22 automatically selects, from the state amount set S1, the state amount P that corresponds to the particular Lv (for example, the lowest Lv, the highest Lv, the intermediate Lv, or the like) regardless of the state amount P that has been selected from the state amount set S2. Further alternatively, for example, when the group travel mode is switched from being valid to being invalid, the execution section 22 automatically selects, from the state amount set S1, the state amount P that has been selected in the last positional relationship adjustment operation executed at the time when the group travel mode is invalid regardless of the state amount P that has been selected from the state amount set S2. Further alternatively, for example, when the group travel mode is switched from being valid to being invalid, the execution section 22 automatically selects, from the state amount set S1, the state amount P that corresponds to the Lv set as the initial value by the rider in advance regardless of the state amount P that has been selected from the state amount set S2.

In the state amount set S2 illustrated in FIG. 7, the state amounts P are small in all the LVs. However, the state amounts P may be the same in some of the LVs, and the state amounts P may be small only in the rest of the LVs. In addition, for example, the state amount P may be another state amount such as the relative distance or the predicted time until the collision. Furthermore, a magnitude relationship between the state amount set S1 and the state amount set S2 may be opposite. That is, in the case where the group travel mode is not valid (corresponding to the "second operation mode" in the invention), in the positional relationship adjustment operation, the state amount set S1 may be used, and the positional relationship between the straddle-type vehicle 100 and the target 200 may be controlled to reduce the passing time difference, that is, to have the approaching tendency (corresponding to the "second state" in the invention). In the case where the group travel mode is valid (corresponding to the "first operation mode" in the invention), in the positional relationship adjustment operation, the state amount set S2 may be used, and the positional relationship between the straddle-type vehicle 100 and the target 200 may be controlled to increase the passing time difference, that is, to have the separating tendency (corresponding to the "first state" in the invention).

As the second example, the execution section 22 uses the state amount set S1 illustrated in FIG. 4 regardless of whether the group travel mode is valid. In the case where the group travel mode is valid, in the positional relationship adjustment operation, the execution section 22 selects, from the state amount set S1, the state amount P that differs from the state amount P corresponding to the rider's setting input information (that is, the Lv information), controls the travel speed of the straddle-type vehicle 100 so as to obtain such a state amount P, and thereby adjusts the positional relationship between the straddle-type vehicle 100 and the target 200.

Here, in the case where the group travel mode is not valid (corresponding to the "first operation mode" in the invention), in the positional relationship adjustment operation, the state amount P that corresponds to the rider's setting input information (that is, the Lv information) is selected from the state amount set S1, and the positional relationship between the straddle-type vehicle 100 and the target 200 is controlled to be in the state of increasing the passing time difference, that is, to be in a state of having the separating tendency (corresponding to the "first state" in the invention). In the case where the group travel mode is valid (corresponding to the "second operation mode" in the invention), in the positional relationship adjustment operation, the state amount P that differs from the state amount P corresponding to the rider's setting input information (that is, the Lv information) is selected from the state amount set S1, and the positional relationship between the straddle-type vehicle 100 and the target 200 is controlled to be in the state of reducing the passing time difference, that is, to be in the state of having the approaching tendency (corresponding to the "second state" in the invention). In the case where the group travel mode is not valid (corresponding to the "second operation mode" in the invention), in the positional relationship adjustment operation, the state amount P that corresponds to the rider's setting input information (that is, the Lv information) may be selected from the state amount set S1, and the positional relationship between the straddle-type vehicle 100 and the target 200 may be controlled to be in the state of reducing the passing time difference, that is, to be in the state of having the approaching tendency (corresponding to the "second state" in the invention). In the case where the group travel mode is valid (corresponding to the "first operation mode" in the invention), in the positional relationship adjustment operation, the state amount P that differs from the state amount P corresponding to the rider's setting input information (that is, the Lv information) may be selected from the state amount set S1, and the positional relationship between the straddle-type vehicle 100 and the target 200 may be controlled to be in the state of increasing the passing time difference, that is, to be in the state of having the separating tendency (corresponding to the "first state" in the invention).

For example, when the group travel mode is switched from being invalid to being valid, the execution section 22 automatically selects, from the state amount set S1, the state amount P that corresponds to the different Lv from the Lv corresponding to the state amount P, which has been selected when the group travel mode is invalid, by a predetermined level. Further alternatively, for example, when the group travel mode is switched from being invalid to being valid, the execution section 22 automatically selects, from the state amount set S1, the state amount P that corresponds to the particular Lv (for example, the lowest Lv, the highest Lv, the intermediate Lv, or the like) regardless of the state amount P that has been selected at the time when the group travel mode is invalid. Further alternatively, for example, when the group travel mode is switched from being invalid to being valid, the execution section 22 automatically selects, from the state amount set S1, the state amount P that has been selected in the last positional relationship adjustment operation executed at the time when the group travel mode is valid regardless of the state amount P that has been selected at the time when the group travel mode is invalid. Further alternatively, for example, when the group travel mode is switched from being invalid to being valid, the execution section 22 automatically selects, from the state amount set S1, the state amount P that corresponds to the Lv set as the initial value by the rider in advance regardless of the state amount P that has been selected at the time when the group travel mode is invalid.

For example, when the group travel mode is switched from being valid to being invalid, the execution section 22 automatically selects, from the state amount set S1, the state amount P that corresponds to the different Lv from the Lv corresponding to the state amount P, which has been selected at the time when the group travel mode is valid, by the predetermined level. Further alternatively, for example, when the group travel mode is switched from being valid to being invalid, the execution section 22 automatically selects, from the state amount set S1, the state amount P that corresponds to the particular Lv (for example, the lowest Lv, the highest Lv, the intermediate Lv, or the like) regardless of the state amount P that has been selected at the time when the group travel mode is valid. Further alternatively, for example, when the group travel mode is switched from being valid to being invalid, the execution section 22 automatically selects, from the state amount set S1, the state amount P that has been selected in the last positional relationship adjustment operation executed at the time when the group travel mode is invalid regardless of the state amount P that has been selected at the time when the group travel mode is valid. Further alternatively, for example, when the group travel mode is switched from being valid to being invalid, the execution section 22 automatically selects, from the state amount set S1, the state amount P that corresponds to the Lv set as the initial value by the rider in advance regardless of the state amount P that has been selected at the time when the group travel mode is valid.

In the first and second examples, the description has been made on the case where, when the validity and the invalidity of the group travel mode are switched, the execution section 22 automatically selects the state amount P, and the state amount P is automatically set as the control value for the positional relationship adjustment operation. However, after the execution section 22 automatically selects the state amount P, the state amount P may automatically be suggested, and with the rider's setting input of the acceptance, the state amount P may be set as the control value for the positional relationship adjustment operation.

In the case where the group travel mode is valid, similar to the case where the group travel mode is not valid, in the positional relationship adjustment operation, the execution section 22 controls such that the absolute value of the first-order derivative and/or the absolute value of the second-order derivative of the travel speed generated to the straddle-type vehicle 100 does not exceed the limit value. The execution section 22 sets the limit value to differ between the case where the group travel mode is valid and the case where the group travel mode is invalid.

Here, in the case where the group travel mode is not valid (corresponding to the "first operation mode" in the invention), in the positional relationship adjustment operation, the limit value is set to be small, that is, the absolute value of the first-order derivative and/or the absolute value of the second-order derivative of the travel speed generated to the straddle-type vehicle 100 is controlled to have a reduction tendency (corresponding to the "first state" in the invention). In the case where the group travel mode is valid (corresponding to the "second operation mode" in the invention), in the positional relationship adjustment operation, the limit value is set to be large, that is, the absolute value of the first-order derivative and/or the absolute value of the second-order derivative of the travel speed generated to the straddle-type vehicle 100 is controlled to have an increase tendency (corresponding to the "second state" in the invention). In the case where the group travel mode is not valid (corresponding to the "second operation mode" in the invention), in the positional relationship adjustment operation, the limit value may be set to be large, that is, the absolute value of the first-order derivative and/or the absolute value of the second-order derivative of the travel speed generated to the straddle-type vehicle 100 may be controlled to have the increase tendency (corresponding to the "second state" in the invention). In the case where the group travel mode is valid (corresponding to the "first operation mode" in the invention), in the positional relationship adjustment operation, the limit value may be set to be small, that is, the absolute value of the first-order derivative and/or the absolute value of the second-order derivative of the travel speed generated to the straddle-type vehicle 100 may be controlled to have the reduction tendency (corresponding to the "first state" in the invention).

In the case where the group travel mode is valid, similar to the case where the group travel mode is invalid, the execution section 22 controls the distribution of the braking force to the front and rear wheels of the straddle-type vehicle 100 to a predetermined ratio when outputting the command to the brake system 30 in order to execute the positional relationship adjustment operation. The execution section 22 sets the ratio to differ between the case where the group travel mode is valid and the case where the group travel mode is invalid.

Here, in the case where the group travel mode is invalid (corresponding to the "first operation mode" in the invention), in the positional relationship adjustment operation, a ratio of the braking force generated on the rear wheel to the entire braking force generated on the front and rear wheels is set to be low, that is, a priority of the rear wheel in the distribution of the braking force to the front and rear wheels of the straddle-type vehicle 100 is controlled to have a reduction tendency (corresponding to the "first state" in the invention). In the case where the group travel mode is valid (corresponding to the "second operation mode" in the invention), in the positional relationship adjustment operation, the ratio of the braking force generated on the rear wheel to the entire braking force generated on the front and rear wheels is set to be high, that is, the priority of the rear wheel in the distribution of the braking force to the front and rear wheels of the straddle-type vehicle 100 is controlled to have an increase tendency (corresponding to the "second state" in the invention). In particular, in a braking process when the group travel mode is valid, preferably, the priority of the rear wheel is increased at the start of braking, and thereafter the priority of the rear wheel is reduced. In the case where the group travel mode is not valid (corresponding to the "second operation mode" in the invention), in the positional relationship adjustment operation, the ratio of the braking force generated on the rear wheel to the entire braking force generated on the front and rear wheels may be set to be high, that is, the priority of the rear wheel in the distribution of the braking force to the front and rear wheels of the straddle-type vehicle 100 may be controlled to have the increase tendency (corresponding to the "second state" in the invention). In the case where the group travel mode is valid (corresponding to the "first operation mode" in the invention), in the positional relationship adjustment operation, the ratio of the braking force generated on the rear wheel to the entire braking force generated on the front and rear wheels may be set to be low, that is, the priority of the rear wheel in the distribution of the braking force to the front and rear wheels of the straddle-type vehicle 100 may be controlled to have the reduction tendency (corresponding to the "first state" in the invention).

The description has been made so far on the case where the selected state amount P, the limit value of the absolute value of the first-order differential and/or the absolute value of the second-order differential of the travel speed generated to the straddle-type vehicle 100, and the ratio of the braking force distribution to the front and rear wheels of the straddle-type vehicle 100 are always switched according to whether the group travel mode is valid. However, the execution section 22 may determine whether to switch those by referring to another type of information.

As the first example, the execution section 22 determines whether the selected state amount P, the limit value of the absolute value of the first-order derivative and/or the absolute value of the second-order derivative of the travel speed generated to the straddle-type vehicle 100, and/or the ratio of the distribution of the braking force to the front and rear wheels of the straddle-type vehicle 100 can be switched according to road line shape information of a road on which the straddle-type vehicle 100 travels. The road line shape information may be acquired from map information or may be acquired on the basis of the output of the vehicle behavior sensor 12 (particularly, the IMU).

For example, in the case where the group travel mode is switched from being invalid to being valid under a situation where the road on which the straddle-type vehicle 100 travels is a straight road, the execution section 22 maintains the selected state amount P to have the separating tendency, that is, prohibits the switchover. In the case where the group travel mode is switched from being invalid to being valid under a situation where the road on which the straddle-type vehicle 100 travels is a curved road, the execution section 22 switches the selected state amount P to have the approaching tendency, that is, permits the switchover. For example, in the case where the group travel mode is switched from being invalid to being valid under the situation where the road on which the straddle-type vehicle 100 travels is the curved road, the execution section 22 maintains the selected state amount P to have the approaching tendency, that is, prohibits the switchover. In the case where the group travel mode is switched from being invalid to being valid under the situation where the road on which the straddle-type vehicle 100 travels is the straight road, the execution section 22 switches the selected state amount P to have the separating tendency, that is, permits the switchover. For example, in the case where the group travel mode is switched from being invalid to being valid under the situation where the road on which the straddle-type vehicle 100 travels is the straight road, the execution section 22 maintains the absolute value of the first-order derivative and/or the absolute value of the second-order derivative of the travel speed generated to the straddle-type vehicle 100 to have the reduction tendency, that is, prohibits the switchover. In the case where the group travel mode is switched from being invalid to being valid under the situation where the road on which the straddle-type vehicle 100 travels is the curved road, the execution section 22 switches the absolute value of the first-order derivative and/or the absolute value of the second-order derivative of the travel speed generated to the straddle-type vehicle 100 to have the increase tendency, that is, permits the switchover. For example, in the case where the group travel mode is switched from being invalid to being valid under the situation where the road on which the straddle-type vehicle 100 travels is the curved road, the execution section 22 maintains the absolute value of the first-order derivative and/or the absolute value of the second-order derivative of the travel speed generated to the straddle-type vehicle 100 to have the increase tendency, that is, prohibits the switchover. In the case where the group travel mode is switched from being invalid to being valid under the situation where the road on which the straddle-type vehicle 100 travels is the straight road, the execution section 22 switches the absolute value of the first-order derivative and/or the absolute value of the second-order derivative of the travel speed generated to the straddle-type vehicle 100 to have the reduction tendency, that is, permits the switchover. For example, in the case where the group travel mode is switched from being invalid to being valid under the situation where the road on which the straddle-type vehicle 100 travels is the straight road, the execution section 22 maintains the priority of the rear wheel in the distribution of the braking force to the front and rear wheels of the straddle-type vehicle 100 to have the reduction tendency, that is, prohibits the switchover. In the case where the group travel mode is switched from being invalid to being valid under the situation where the road on which the straddle-type vehicle 100 travels is the curved road, the execution section 22 switches the priority of the rear wheel in the distribution of the braking force to the front and rear wheels of the straddle-type vehicle 100 to have the increase tendency, that is, permits the switchover.

For example, in the case where the group travel mode is switched from being invalid to being valid under the situation where the road on which the straddle-type vehicle 100 travels is the curved road, the execution section 22 maintains the priority of the rear wheel in the distribution of the braking force to the front and rear wheels of the straddle-type vehicle 100 to have the increase tendency, that is, prohibits the switchover. In the case where the group travel mode is switched from being invalid to being valid under the situation where the road on which the straddle-type vehicle 100 travels is the straight road, the execution section 22 switches the priority of the rear wheel in the distribution of the braking force to the front and rear wheels of the straddle-type vehicle 100 to have the reduction tendency, that is, permits the switchover.

As the second example, the execution section 22 determines whether the selected state amount P, the limit value of the absolute value of the first-order derivative and/or the absolute value of the second-order derivative of the travel speed generated to the straddle-type vehicle 100, and/or the ratio of the distribution of the braking force to the front and rear wheels of the straddle-type vehicle 100 can be switched according to the location information of the straddle-type vehicle 100 in the group (for example, information on traveling ahead, in the middle, on the tail, or the like of the group).

For example, in the case where the group travel mode is switched from being invalid to being valid under a situation where the straddle-type vehicle 100 travels ahead of the group, the execution section 22 maintains the selected state amount P to have the separating tendency, that is, prohibits the switchover. In the case where the group travel mode is switched from being invalid to being valid under a situation where the straddle-type vehicle 100 does not travel ahead of the group, the execution section 22 switches the selected state amount P to have the approaching tendency, that is, permits the switchover. For example, in the case where the group travel mode is switched from being invalid to being valid under a situation where the straddle-type vehicle 100 does not travel ahead of the group, the execution section 22 maintains the selected state amount P to have the approaching tendency, that is, prohibits the switchover. In the case where the group travel mode is switched from being invalid to being valid under the situation where the straddle-type vehicle 100 travels ahead of the group, the execution section 22 switches the selected state amount P to have the separating tendency, that is, permits the switchover. For example, in the case where the group travel mode is switched from being invalid to being valid under a situation where the straddle-type vehicle 100 does not travel on the tail of the group, the execution section 22 maintains the absolute value of the first-order derivative and/or the absolute value of the second-order derivative of the travel speed generated to the decelerated straddle-type vehicle 100 to have the reduction tendency, that is, prohibits the switchover. In the case where the group travel mode is switched from being invalid to being valid under a situation where the straddle-type vehicle 100 travels on the tail of the group, the execution section 22 switches the absolute value of the first-order derivative and/or the absolute value of the second-order derivative of the travel speed generated to the decelerated straddle-type vehicle 100 to have the increase tendency, that is, permits the switchover. For example, in the case where the group travel mode is switched from being invalid to being valid under the situation where the straddle-type vehicle 100 travels on the tail of the group, the execution section 22 maintains the absolute value of the first-order derivative and/or the absolute value of the second-order derivative of the travel speed generated to the decelerated straddle-type vehicle 100 to have the increase tendency, that is, prohibits the switchover. In the case where the group travel mode is switched from being invalid to being valid under a situation where the straddle-type vehicle 100 does not travel on the tail of the group, the execution section 22 switches the absolute value of the first-order derivative and/or the absolute value of the second-order derivative of the travel speed generated to the decelerated straddle-type vehicle 100 to have the reduction tendency, that is, permits the switchover. For example, in the case where the group travel mode is switched from being invalid to being valid under the situation where the straddle-type vehicle 100 travels on the tail of the group, the execution section 22 maintains the priority of the rear wheel in the distribution of the braking force to the front and rear wheels of the straddle-type vehicle 100 to have the reduction tendency, that is, prohibits the switchover. In the case where the group travel mode is switched from being invalid to being valid under the situation where the straddle-type vehicle 100 does not travel on the tail of the group, the execution section 22 switches the priority of the rear wheel in the distribution of the braking force to the front and rear wheels of the straddle-type vehicle 100 to have the increase tendency, that is, permits the switchover. For example, in the case where the group travel mode is switched from being invalid to being valid under the situation where the straddle-type vehicle 100 does not travel on the tail of the group, the execution section 22 maintains the priority of the rear wheel in the distribution of the braking force to the front and rear wheels of the straddle-type vehicle 100 to have the increase tendency, that is, prohibits the switchover. In the case where the group travel mode is switched from being invalid to being valid under the situation where the straddle-type vehicle 100 travels on the tail of the group, the execution section 22 switches the priority of the rear wheel in the distribution of the braking force to the front and rear wheels of the straddle-type vehicle 100 to have the reduction tendency, that is, permits the switchover.

Operation of Rider-Assistance System

A description will be made on operation of the rider-assistance system according to the embodiment.

FIG. 8 is a chart for explaining an operation flow of the controller in the rider-assistance system according to the embodiment of the invention.

The controller 20 executes the operation flow illustrated in FIG. 8 during the travel of the straddle-type vehicle 100.

Acquisition Step

In step S101, the acquisition section 21 acquires the positional relationship information between the traveling straddle-type vehicle 100 and the target 200. The acquisition section 21 also acquires the various types of the information when necessary.

Execution Step

In step S102, the execution section 22 executes the positional relationship adjustment operation to automatically change the travel speed of the straddle-type vehicle 100 on the basis of the positional relationship information acquired in step S101 and to thereby adjust the positional relationship between the straddle-type vehicle 100 and the target 200. In the positional relationship adjustment operation, the execution section 22 implements the different operation mode between the case where the group travel mode is valid and the case where the group travel mode is not valid. In the different operation modes, the positional relationship between the straddle-type vehicle 100 and the target 200 differs.

Effects of Rider-Assistance System

A description will be made on effects of the rider-assistance system according to the embodiment.

In the positional relationship adjustment operation, the controller 20 switches between the first operation mode, in which the positional relationship between the straddle-type vehicle 100 and the target 200 is brought into the first state, and the second operation mode, in which the positional relationship between the straddle-type vehicle 100 and the target 200 is brought into the second state differing from the first state, according to whether the group travel mode is valid. The group travel mode is the mode in which the straddle-type vehicle 100 travels with at least one of the other straddle-type vehicles 300 in the group. Therefore, it is possible to execute the appropriate positional relationship adjustment operation under a situation where the plural straddle-type vehicles 100, 300 travel in line or side by side in a unique positional relationship, and it is thus possible to improve assistance performance for the rider.

Preferably, the first state is the state where the positional relationship between the straddle-type vehicle 100 and the target 200 has the separating tendency, and the second state is the state where the positional relationship between the straddle-type vehicle 100 and the target 200 has the approaching tendency. With such a configuration, under the situation where the straddle-type vehicle 100 travels with at least one of the other straddle-type vehicles 300 in the group, it is possible to appropriately control the location of the straddle-type vehicle 100 and thus to further optimize the positional relationship adjustment operation.

Preferably, the first state is the state where the absolute value of the first-order derivative and/or the absolute value of the second-order derivative of the travel speed generated to the straddle-type vehicle 100 has the reduction tendency, and the second state is the state where the absolute value of the first-order derivative and/or the absolute value of the second-order derivative of the travel speed generated to the straddle-type vehicle 100 has the increase tendency. With such a configuration, under the situation where the straddle-type vehicle 100 travels with at least one of the other straddle-type vehicles 300 in the group, it is possible to appropriately control the change in the travel speed generated to the straddle-type vehicle 100 and thus to further optimize the positional relationship adjustment operation.

Preferably, the first state is the state where the priority of the rear wheel in the distribution of the braking force to the front and rear wheels of the straddle-type vehicle 100 has the reduction tendency, and the second state is the state where the priority of the rear wheel in the distribution of the braking force to the front and rear wheels of the straddle-type vehicle 100 has the increase tendency. With such a configuration, under the situation where the straddle-type vehicle 100 travels with at least one of the other straddle-type vehicles 300 in the group, it is possible to appropriately control the time required from the actuation of the brake system 30 in the straddle-type vehicle 100 to the generation of the desired deceleration to the straddle-type vehicle 100, and it is thus possible to further optimize the positional relationship adjustment operation.

The description has been made so far on the embodiment. However, only a part of the embodiment may be implemented, parts of the embodiment may be combined, or a part of the embodiment may be modified to another aspect. In other words, the invention is not limited to the embodiment that has been described.

For example, the description has been made so far on the case where, as the positional relationship adjustment operation, the execution section 22 executes the operation to adjust the positional relationship between the straddle-type vehicle 100 and the target 200 in the front-rear direction of the travel lane DL. However, the execution section 22 may execute, as the positional relationship adjustment operation, operation to adjust the positional relationship between the straddle-type vehicle 100 and the target 200 in the width direction of the travel lane DL. In such a case, preferably, the controller 20 outputs a command to a drive mechanism that is added to a steering system of the straddle-type vehicle 100, and executes the rider-assistance operation.

REFERENCE SIGNS LIST

1: Rider-assistance system
11: Surrounding environment sensor
12: Vehicle behavior sensor
13: Setting input device
20: Controller
21: Acquisition section
22: Execution section
30: Brake system
40: Drive system
50: Notification device
100: Straddle-type vehicle
200: Target
300: Another straddle-type vehicle
300I: Imaginary vehicle
DL: Travel lane
L1: First vehicle line
L2: Second vehicle line
P: State amount
S1, S2: State amount set
d1, d2: Distance

The invention claimed is:

1. A controller (20) for behavior of a straddle-type vehicle (100), the controller (20) configured to:

acquire positional relationship information between the traveling straddle-type vehicle (100) and a target (200); and execute a positional relationship adjustment operation to automatically change a travel speed of the straddle-type vehicle (100) on the basis of the positional relationship information acquired by the controller (20) and to thereby adjust a positional relationship between the straddle-type vehicle (100) and the target (200), wherein in the positional relationship adjustment operation, switch between a first operation mode in which the positional relationship between the straddle-type vehicle (100) and the target (200) is brought into a first state and a second operation mode in which the positional relationship between the straddle-type vehicle (100) and the target (200) is brought into a second state differing from the first state according to whether a group travel mode is valid, the group travel mode being a mode in which the straddle-type vehicle (100) travels with at least one other straddle-type vehicle (300) in a group, wherein in the positional relationship adjustment operation, the controller prohibits switchover between the first operation mode and the second operation mode according to road line shape information.

2. The controller (20) according to claim 1, wherein the first state is a state where the positional relationship between the straddle-type vehicle (100) and the target (200) has a separating tendency, and the second state is a state where the positional relationship between the straddle-type vehicle (100) and the target (200) has an approaching tendency.

3. The controller (20) according to claim 2, wherein according to setting input information by a rider of the straddle-type vehicle (100), the controller selects one state amount (P) from a state amount set (S1, S2) in which plural state amounts (P), each of which defines the positional relationship between the straddle-type vehicle (100) and the target (200), are combined, and in the positional relationship adjustment operation, adjusts the positional relationship between the straddle-type vehicle (100) and the target (200) on the basis of the selected one state amount (P).

4. The controller (20) according to claim 3, wherein the controller uses a different state amount set (S1, S2) between the first operation mode and the second operation mode.

5. The controller (20) according to claim 3, wherein the controller uses the same state amount set (S1) in the first operation mode and the second operation mode.

6. The controller (20) according to claim 1, wherein the first state is a state where an absolute value of a first-order derivative and/or an absolute value of a second-order derivative of the travel speed generated to the straddle-type vehicle (100) is controlled to not exceed a first limit value, such that the absolute value of the first-order derivative and/or the absolute value of the second-order derivative of the travel speed has a reduction tendency, and the second state is a state where the absolute value of the first-order derivative and/or the absolute value of the second-order derivative of the travel speed generated to the straddle-type vehicle (100) is controlled to not exceed a second limit value that is larger than the first limit value, such that the absolute value of the first-order derivative and/or the absolute value of the second-order derivative of the travel speed has an increase tendency.

7. The controller (20) according to claim 1, wherein the first state is a state where a priority of a rear wheel in distribution of a braking force to front and rear wheels in the straddle-type vehicle (100) has a reduction tendency in that a ratio of the braking force generated on the rear wheel to an entire braking force generated on the front and rear wheels is set to be low, and the second state is a state where the priority of the rear wheel in the distribution of the braking force to the front and rear wheels in the straddle-type vehicle (100) has an increase tendency in that a ratio of the braking force generated on the rear wheel to the entire braking force generated on the front and rear wheels is set to be high.

8. The controller (20) according to claim 1, wherein in the positional relationship adjustment operation, the controller prohibits switchover between the first operation mode and the second operation mode according to location information of the straddle-type vehicle (100) in the group.

9. The controller (20) according to claim 1, wherein the target (200A) is the other straddle-type vehicle (300) that belongs to the same vehicle line (L1) as the straddle-type vehicle (100) in the group.

10. The controller (20) according to claim 1, wherein the target (200B) is the other straddle-type vehicle (300) that belongs to a different vehicle line (L2) from the straddle-type vehicle (100) in the group.

11. The controller (20) according to claim 1, wherein the target (200C) is an imaginary vehicle (300I) that represents plural other straddle-type vehicles (300) traveling with the straddle-type vehicle (100) in the group.

12. A control method for behavior of a straddle-type vehicle (100), the control method comprising:

an acquisition step (S101) in which a controller (20) acquires positional relationship information between the traveling straddle-type vehicle (100) and a target (200); and an execution step (S102) in which the controller (20) executes positional relationship adjustment operation to automatically change a travel speed of the straddle-type vehicle (100) on the basis of the positional relationship information acquired in the acquisition step (S101) and to thereby adjust a positional relationship between the straddle-type vehicle (100) and the target (200), wherein in the execution step (S102), in the positional relationship adjustment operation, the controller switches between a first operation mode in which the positional relationship between the straddle-type vehicle (100) and the target (200) is brought into a first state and a second operation mode in which the positional relationship between the straddle-type vehicle (100) and the target (200) is brought into a second state differing from the first state according to whether a group travel mode is valid, the group travel mode being a mode in which the straddle-type vehicle (100) travels with at least one other straddle-type vehicle (300) in a group, wherein in the positional relationship adjustment operation, the controller prohibits switchover between the first operation mode and the second operation mode according to road line shape information.

* * * * *